Dec. 18, 1956   N. C. GLAD   2,774,552
HELICOPTER AIR CIRCULATING SYSTEM
Filed April 25, 1955   2 Sheets-Sheet 1

INVENTOR
NICHOLAS C. GLAD
BY *M. B. Tasker*
ATTORNEY

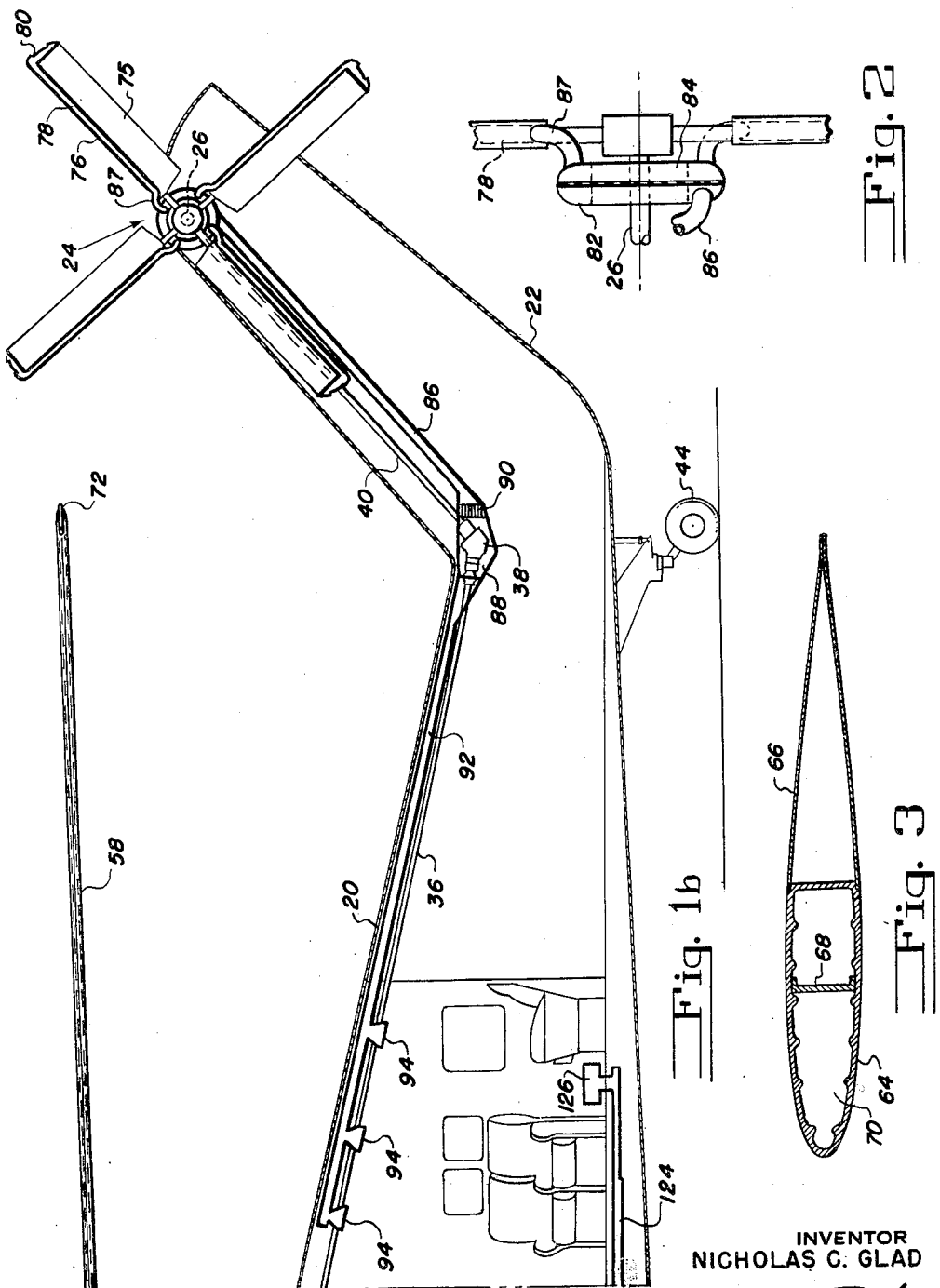

United States Patent Office 2,774,552
Patented Dec. 18, 1956

2,774,552

HELICOPTER AIR CIRCULATING SYSTEM

Nicholas C. Glad, Stratford, Conn., assignor to United Aircraft Corporation, East Hartford, Conn., a corporation of Delaware Application April 25, 1955, Serial No. 503,604

12 Claims. (Cl. 244—17.11)

This invention relates to rotary wing aircraft and has as one of its objects the provision of improved means for heating the pilot and passenger compartments of such aircraft, or for cooling them, as the need may arise.

Another object of the invention is the provision of improved means for cooling certain components of the aircraft transmission such as the gear boxes while at the same time utilizing the heat abstracted for de-icing purposes.

A further object of the invention is the provision of means associated with the rotors of such aircraft for circulating the air for the above purposes.

A still further obejct of the invention is the reduction of weight in connection with transmission oil coolers, gear box blowers and cabin heaters as well as saving the power heretofore required to operate these devices.

A yet further object of the invention is the provision of an air circulating system for a helicopter which is operative whenever the rotor is turning irrespective of whether or not the ship is airborne.

Another object of the invention is generally to improve the comfort and safety of rotary wing aircraft.

These and other objects and advantages of the invention will be obvious or will be specifically pointed out in the following detailed description of one embodiment of the invention shown in the accompanying drawings. In these drawings:

Fig. 1a and Fig. 1b together constitute a side view of a helicopter embodying the invention;

Fig. 2 is a detail showing the air distributor of the tail rotor;

Fig. 3 is a cross sectional view of a rotor blade.

Figure 1D:
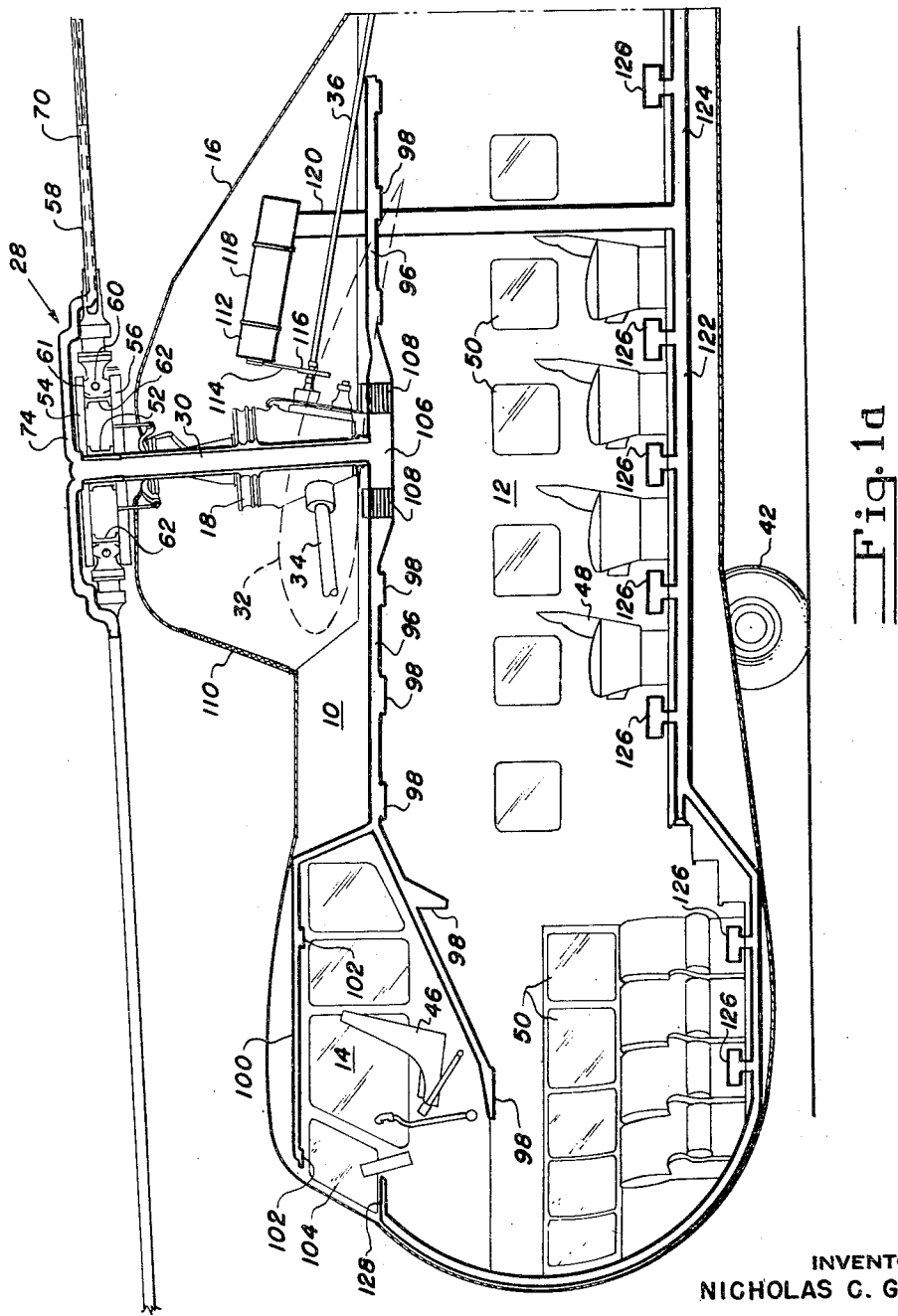

Referring to Fig. 1, 10 indicates the fuselage of the helicopter which encloses the main passenger compartment, or cabin, 12 and the pilot compartment 14 which is located above the cabin at the forward end of the fuselage. A main rotor pylon 16 is located above the cabin amidships and contains the main transmission gear box 18. A tail cone 20 carries a tail rotor pylon 22 which supports a tail rotor, generally indicated at 24, rotatably on a generally horizontal shaft 26. The main sustaining rotor, generally indicated at 28, is mounted at the upper end of a hollow drive shaft 30 which extends upward through the gear box and is journalled therein for rotation with the main rotor.

Two engines are provided (not shown) located in two nacelles carried by short wings 32 which project on opposite sides of the fuselage, one of which is shown in dotted lines in Fig. 1. The engines are connected by oblique drive shafts 34 which extend through the stub wings and into the gear box 18, one of these shafts being shown in Fig. 1. A tail rotor drive shaft 36 is also driven from the gear box and extends along the top of the tail cone 20 to an intermediate gear box 38 located at the base of pylon 22. Drive shaft 40 extends from the intermediate gear box upward along the pylon 22 and drives the tail rotor shaft 26 in a usual manner.

A pair of main landing wheels 42 are provided near the forward end of the ship and a tricycle wheel 44 is provided at the end of the tail cone for supporting the helicopter on the ground. The pilot compartment includes seats 46 for a pilot and co-pilot and the usual controls for the helicopter. The passengers are seated in rows of seats 48 which extend along the opposite sides of the fuselage adjacent a series of windows 50.

As previously stated, the hollow drive shaft 30 is journalled for rotation in the gear box 18. At its upper end the shaft 30 is splined to a spool 52 attached by suitable bolts to upper and lower plate members 54 and 56 between which the rotor blades 58 are journalled on intersecting flapping and drag hinges 60 and 61. The plates 54 and 56 are further supported by spacers 62 which are suitably secured therebetween. The blades 58 have hollow spar members 64 which extend from the root to the tip thereof and form the main strength member of the blades. The spar member, as shown in Fig. 3, conforms to the airfoil contour of the blade throughout the chordwise extent of the spar and sheet metal pocket members 66 secured to the trailing edge of the spar complete the airfoil contour of the blade. Preferably, a spanwise partition 68 is provided in the spar to form a leading edge passage 70 which extends throughout the entire spanwise extent of the blade. At the tip end of the blade a nozzle 72 is provided which communicates with passage 70. At the inboard end of the blade a duct 74 is provided which communicates at its inner end with the hollow drive shaft 30 and at its outer end with the passage 70 in the spar.

The tail rotor blades 75 are similarly formed with leading edge hollow spar members 76 providing spanwise passages 78 from the root to the tip of the blade where a discharge nozzle 80 is provided. The hub of the tail rotor is provided with air distribution means including a fixed ring 82 and a ring 84 which rotates with the rotor hub. The fixed ring 82 communicates with a suction duct 86 while the rotating ring 84 communicates through a connector 87 with the passage 78 in the blade spar. The suction duct 86 extends through the tail rotor pylon 22 and connects with a chamber 88 at the junction of the tail rotor pylon and the tail cone in which the intermediate gear box 38 is located. Also located in this chamber is the oil cooler 90 for the intermediate gear box 38. The chamber 88 is connected with a suction duct 92 which extends along the upper portion of the tail cone and above the aft portion of the cabin 12 where a plurality of exhaust openings 94 are provided in the cabin ceiling.

A similar suction duct 96 extends along the cabin roof and beneath the pilot compartment and is provided with air inlets 98 at suitable intervals for collecting foul air and discharging it from the cabin. Suction duct 96 also has an extension 100 which extends along the roof of the pilot compartment and is provided with openings 102 for exhausting air from the pilot compartment, the most forward opening 102 being located adjacent the windshield 104. Directly beneath the hollow shaft 30 the suction duct 96 is enlarged to form a plenum chamber 106 which communicates with hollow drive shaft 30. Two main gear box oil coolers 108 are disposed in chamber 106 one on each side of the hollow shaft 30 so that air entering the chamber 106 from suction duct 96 from either direction passes through the oil coolers and is heated thereby.

It will be understood that when the blades 58 are rotating the centrifugal force acting on the column of air in the hollow spars thereof will cause the air to be discharged through the blade tip nozzles 72 thus causing air to be drawn up through hollow drive shaft 30 from suction ducts 96.

The main rotor pylon 16 has a screened air inlet 110 through which air enters and circulates around the gear box 18 thus helping to cool the latter. In accordance with this invention, air is exhausted from the pylon chamber by a blower 112 which is driven by belting 114 from a pulley 116 on the tail rotor drive shaft 36, this pulley being located adjacent the gear box 18. Air from the blower 112 is forced through an internal combustion heater 118 and into a duct 120 which extends downwardly through the cabin to a lower cabin level where it communicates with a forwardly extending duct 122 and a rearwardly extending duct 124. Ducts 122 and 124 are provided with side wall hot air exits, or registers, 126 at regular intervals along the cabin wall by which hot air can be supplied for heating the cabin or, if desired, by shutting off the heater, cool air can be supplied to the cabin. The forwardly extending duct 122 extends upwardly around the nose of the cabin and is discharged at 128 at the base of the windshield 104.

In the operation of the device, air is pumped up through the hollow drive shaft 30 by the action of the rotating blades and withdraws air from the cabin 12 through the inlets 98. Air is also withdrawn from the pilot compartment through inlets 102. The air thus withdrawn passes over the radiating surfaces of the oil coolers 108 and is heated to a suitable temperature for de-icing the blades. It has been found that a temperature of 105° F. is a good temperature providing there is a sufficient volume of air moving through the plates. The oil coolers for the gear box 18 provide sufficient heat to heat a large volume of air to this temperature and, of course, the heating effect is increased as the power transmitted to the rotor increases at higher speeds.

At the same time a plentiful supply of fresh air entering through the screened opening 110 is forced by the blower 112 through the pressure ducts 122, 124 and through registers 126 to the cabin. If the temperature conditions require it the internal combustion heater 118 is used to heat the air entering the cabin.

The operation of the tail rotor for de-icing is similar, the air entering the ventilators 94 being passed over the intermediate gear box 38 and its oil cooler 90 to heat the air in duct 86 to a suitable temperature for de-icing the tail rotor blades 75. The pumping action of the tail rotor is also used to withdraw air from the aft portion of the cabin through the ventilators 94.

It will be evident that as a result of this invention means has been provided for de-icing the rotor blades of both the main and tail rotors without recourse to heavy, expensive heating equipment formerly required. It will also be clear that de-icing of the blades and heating of the cabin is provided for with a small auxiliary heater which is supplied with air by a blower driven from a power take off on the tail rotor drive shaft. The heater may be separated from drive shaft 36 and be driven by an electric motor, thus providing heat or ventilation when the rotors are not operating.

With the arrangement of the registers 126 along the side wall of the cabin and the discharge of heated air over the windshield 104 it is possible to prevent fogging of the glass in the cabin since cold low humidity air is constantly taken in from outside, heated and then discharged through the rotor blades.

Thus, by reason of the present invention it is possible to de-ice rotor blades by means utilizing already available heat which would otherwise be wasted while greatly increasing the comfort and safety of the aircraft as a whole.

While only a single embodiment of the invention has been shown in connection with a helicopter, it will be evident that various changes in the construction and arrangement of the parts may be resorted to without departing from the scope of the invention and that the invention is applicable to all types of rotary wing aircraft,

I claim:

1. In an air circulating system for a helicopter type aircraft in combination, a fuselage having a cabin, a suction duct extending along said fuselage in communication with said cabin, a hollow mast having its lower end connected with said suction duct, and means for creating a suction to withdraw air from said cabin through said duct and said hollow mast including a rotatable blade having a spanwise duct communicating with said mast at its inboard end and communicating with a blade orifice outboard from said mast.

2. In an air circulating system for a helicopter type aircraft in combination, a fuselage having a cabin, a suction duct extending along said fuselage in communication with said cabin at a plurality of points therealong, a hollow mast in communication with said duct, transmission oil coolers intercepting the stream of air flowing through said duct and said mast, and means communicating with the upper end of said mast for pumping air out of said cabin including a rotatable blade having a spanwise duct communicating at its inboard end with said mast and communicating with a blade orifice outboard from said mast.

3. In an air circulating system for a helicopter type aircraft in combination, a fuselage having a cabin, a rotor on said aircraft having a blade provided with a spanwise duct, a hollow mast in communication with said spanwise duct at its inboard end, said spanwise duct communicating with a blade orifice outboard from said mast, a chamber beneath said mast in communication with the passage through the latter, a suction duct extending along said fuselage in communication with said cabin and connected with said chamber, a pressure duct extending along said fuselage and communicating with said cabin, and means for introducing air under pressure to said pressure duct.

4. An air circulating system as claimed in claim 3 in which transmission oil coolers are located in said chamber.

5. An air circulating system as claimed in claim 3 in which said suction duct extends along said fuselage near the cabin roof and said pressure duct extends along said fuselage near the cabin floor.

6. In an air circulating system for a helicopter type aircraft, an elongated fuselage, a pylon chamber above said fuselage, a cabin below said chamber, air inlet means for said chamber, a pressure duct communicating with said chamber and extending along said cabin and discharging into the latter at a number of locations, a heater in said pressure duct, a blower for moving air from said chamber through said heater into said pressure duct, a suction duct extending along said fuselage and having inlet ports at a number of locations communicating with said cabin, a rotor including a blade having a spanwise duct with an outboard end communicating with a blade orifice, and a hollow mast communicating at its upper end with the inboard end of said blade duct and communicating at its lower end with said suction duct.

7. In ai air circulating system for a helicopter type aircraft, an elongated fuselage, a pylon chamber above said fuselage, a cabin below said chamber, air inlet means for said chamber, a pressure duct extending from said chamber into the lower portion of said fuselage and extending along said cabin floor and having ports for discharging into said cabin at a number of locations, a heater in said chamber, a blower for forcing air through said heater and into said pressure duct, a suction duct extending along said fuselage near the cabin roof having inlet ports at a number of locations communicating with said cabin, a transmission gear box in said chamber having a hollow drive shaft connected at its lower end with said suction duct and extending above said chamber, a rotor including a blade having a spanwise duct connected to said hollow shaft at its inboard end and communicating at its outboard end with a blade orifice, and transmission oil coolers in the stream of air flowing through said suction duct for heating the air flowing through said blade and de-icing said blade.

8. In an air circulating system for a helicopter type aircraft, an elongated fuselage having a lower level cabin and an upper level pilot compartment, a pylon enclosing a transmission chamber above said cabin and aft of said pilot compartment, air inlet means for said transmission chamber, a pressure duct extending from said transmission chamber into said cabin and extending along the cabin floor and up into said pilot compartment, said pressure duct having discharge outlets at numerous points along its length including an outlet adjacent the windshield in said pilot compartment, a suction duct extending along the roof of said cabin having a number of inlet ports communicating with said pilot compartment and with said cabin, a transmission gear box in said transmission chamber having a hollow shaft communicating with said suction duct at its lower end, a rotor mounted at the upper end of said shaft including a blade having a spanwise duct communicating with a blade orifice outboard from said hollow shaft and communicating with said hollow shaft at its inboard end, means in said chamber for forcing air into said pressure duct, and means for introducing heat into said suction duct at the base of said shaft.

9. In an air circulating system for a helicopter type aircraft having a cabin, a fuselage having a main rotor pylon, a tail cone and a tail rotor pylon, a main sustaining rotor above said main rotor pylon, a gear box in said main rotor pylon, tail rotor drive shaft means extending from said gear box to said tail rotor including an intermediate gear box having an oil cooler, pressure duct means extending from said main rotor pylon into said cabin and having discharge outlets into said cabin at a plurality of points, suction duct means extending along said cabin having a plurality of inlet ports communicating with said cabin, a main rotor including a rotor blade having a spanwise duct communicating with a blade nozzle, a tail rotor including a blade having a spanwise duct communicating with a blade nozzle, duct means connecting said main rotor blade with said suction duct means, and duct means connecting said tail rotor blade with said suction duct means, the duct means connecting said tail rotor blade including a chamber in which said intermediate gear box and its oil cooler are located.

10. In an air circulating system for a helicopter type aircraft, an elongated fuselage having a cabin and a main rotor pylon above said cabin, a main sustaining rotor above said fuselage, transmission means in said pylon for driving said rotor including a hollow drive shaft, said rotor including a blade having a spanwise duct connected at its inboard end with said hollow shaft and having its outboard end communicating with a blade nozzle, a chamber communicating with said hollow shaft at the lower end thereof, a suction duct extended from said chamber forward at cabin roof level, a suction duct extended aft from said chamber at cabin roof level, said suction ducts having inlet ports opening into said cabin, air inlet means for said pylon, a pressure duct originating in said pylon, a fan for forcing air into said duct, and a heater for heating air in said duct, said pressure duct having distribution lines extending fore and aft at cabin floor level and having discharge ports for supplying heated air to said cabin.

11. An air circulating system as claimed in claim 10 having oil coolers for said transmission means located in said chamber for heating the air entering said drive shaft.

12. In a helicopter, an elongated fuselage, a main rotor pylon carried by said fuselage, a transmisison gear box in said pylon having a hollow drive shaft, a main sustaining rotor mounted on the upper end of said drive shaft and including a rotor blade having a spanwise duct communicating with said hollow shaft at its inboard end and having its outboard end communicating with a blade nozzle, whereby when said rotor is turning centrifugal force acting on the air in said blade duct causes air to be sucked upwardly through said hollow shaft, and means for heating the air flowing through said blade for de-icing purposes including a chamber communicating with the lower end of said hollow shaft, and gear box oil coolers located in said chamber.

References Cited in the file of this patent

UNITED STATES PATENTS

| 2,327,737 | Pendergast | Aug. 24, 1943 |
| 2,469,480 | Sikorsky | May 10, 1949 |
| 2,499,832 | Palmatier | Mar. 5, 1950 |

FOREIGN PATENTS

| 544,227 | Great Britain | Apr. 2, 1942 |

OTHER REFERENCES

Jane's "All the World's Aircraft," 1953–1954, pp. 58, 59.